Jan. 20, 1959     F. H. SMITH     2,869,880
TOOL HOLDER
Filed June 21, 1957
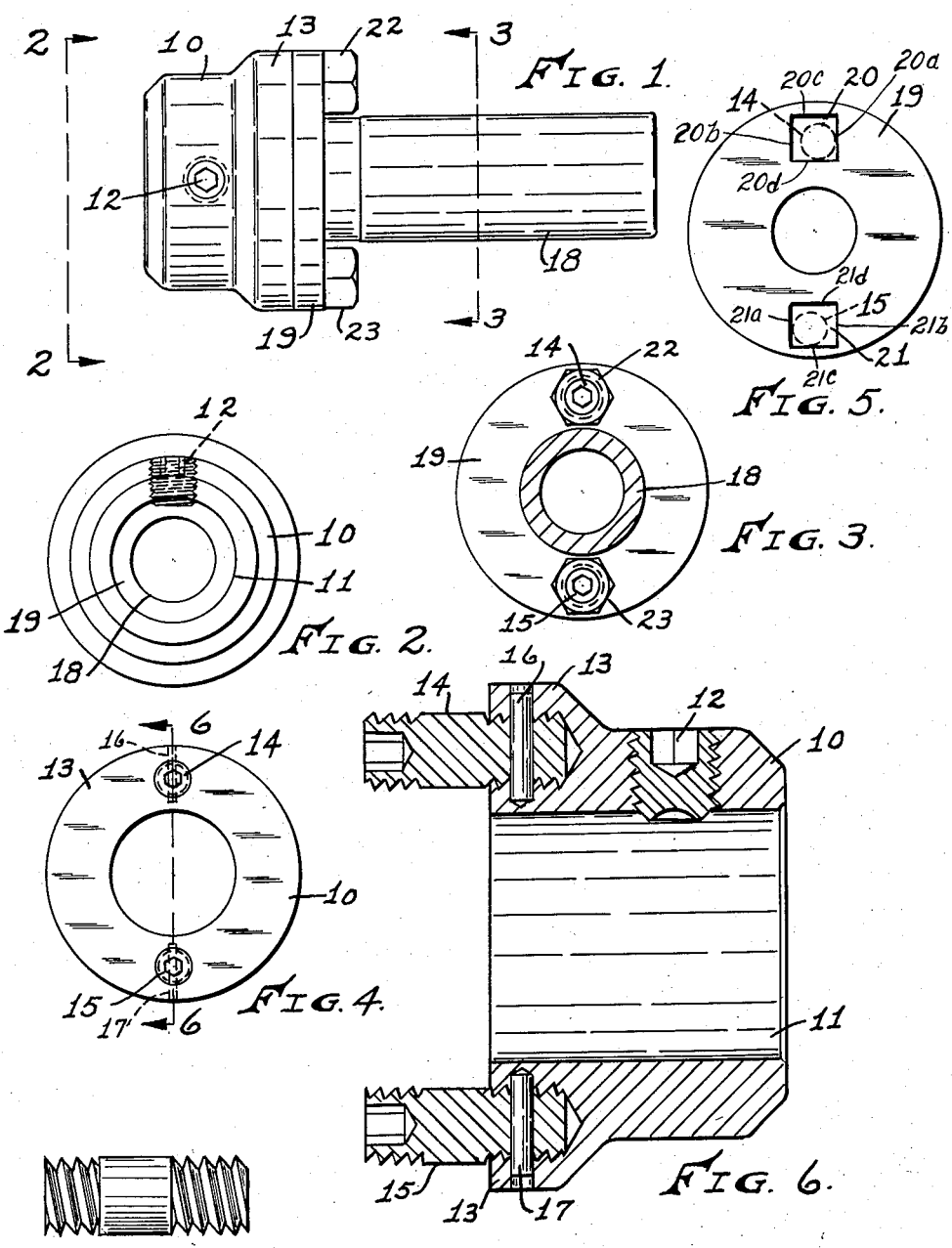

United States Patent Office

2,869,880
Patented Jan. 20, 1959

2,869,880

TOOL HOLDER

Frederick H. Smith, Dayton, Ohio

Application June 21, 1957, Serial No. 667,179

5 Claims. (Cl. 279—6)

The present invention relates to tool holders which are adapted to be used on high speed automatic and hand operated screw machines for the purpose of holding a bushing in which the tool is inserted, and with the holder providing means which permits exact adjustment for aligning the tool with the work in a minimum of time.

I am fully aware that tool holders, as such, are old in the art. Conventional types of tool holders however, are provided with cap screws extending through the flanged shank member and with the screws being threaded into a flanged head member. In adjusting the conventional holder for tool alignment, the tool is brought into alignment, after which the cap screws are tightened. In tightening the cap screws after alignment of the tool, the adjustment is usually disturbed by the tightening of the cap screws in their threaded holes due to there being a slight amount of clearance between the threaded holes and the threads of the cap screws. This difference or clearance between the threads may cause the operator to align the tool several times before the tool can be finally brought to its exact position in alignment with the work, and with the adjustments consuming much valuable time.

The principal object of the present invention is the provision of a holder provided with means for adjustment, and in which the first adjustment of the position of the holder is positive.

A second object is the provision of a tool holder in which threaded studs are used in providing tightening means for the holder.

Another object is the provision of means for locking the adjustment of a tool holder in which threaded studs are provided, and with the studs being pinned in position to prevent the loosening thereof.

Other particular objects and advantages of the invention will become more apparent in the course of the following description, and that which is new will be set forth in the appended claims.

The preferred and most satisfactory manner of carrying out the principles and advantages of the invention in a practical, economical and efficient manner is shown in the accompanying drawing, in which:

Figure 1 is an elevational view of the assembled holder.

Figure 2 is a front end elevation of the holder, taken from line 2—2 of Figure 1.

Figure 3 is a section-elevational view taken from line 3—3 of Figure 1.

Figure 4 is a detail rear elevation of the head member of the holder, and showing the studs therein.

Figure 5 is a front end elevation of the shank member, with the same showing the holes through which the studs extend.

Figure 6 is an enlarged detail section through the head member, as taken on line 6—6 of Figure 4, with the same showing the method of securing the studs in the head member.

Figure 7 is an elevational view of one of the studs.

Like characters of reference designate like parts throughout the several views of the drawing.

In order that the invention may be more fully understood and appreciated, I will now take up a detailed description thereof in which the same will be more fully set forth.

Referring now to the drawing in detail, numerals 10 designate the head member of the holder. The head member has a bore 11 formed therethrough for the reception of a tool bushing (not shown), and with a set screw 12 being provided for rigidly securing the bushing therein. The flange 13 of the head member 10 is threaded for the reception of studs 14 and 15 which are threaded thereinto and with one end of the studs projecting rearwardly beyond the rear surface or face of the flange 13. It will be noted, by referring to Figure 6, that the studs 14 and 15 are secured against loosening by means of respective pins 16 and 17. It will be further noted that the pins 16 and 17 do not extend entirely through the wall of flange 13. It will also be noted that the pins 16 and 17 are set below the outer surface of the head flange 13, with the space formed thereby providing a guide for a drill should it be necessary to remove the pins in order to remove the studs 14 and 15.

The shank member of the device is composed of the shank portion 18, with the same having a flange 19 formed on the forward end thereof. Holes 20 and 21 are provided through flange 19, with the holes being adapted to register with the studs 14 and 15 of head member 10. Holes 20 and 21, as shown in Figure 5, are of considerably larger size than studs 14 and 15, thereby permitting the head 10 to be aligned with the work without movement of the shank. The holes 20 and 21, being square, do not permit any cam movement between the holes and the studs as might be present if the holes were round as in the conventional types of holders. The studs 14 and 15 are shown by dotted lines in Figure 5 and showing a position the same may assume in the alignment operation. It will be noted, by referring to Figure 7, that the central portion of the studs is not threaded, and thereby providing a better contact with the sides of the respective holes 20 and 21. As clearly seen in Figure 5, the sides 20a, 20b, 21a and 21b of the holes 20 and 21 are parallel to the radii of the flange 19 passing through the center of the holes 20 and 21. The sides 20c, 20d, 21c and 21d are perpendicular to these radii.

Threaded nuts 22 and 23 are provided for tightening the head 10 against the forward face of flange 19 in adjusted and aligned position.

Operation

In the use and operation of the tool holder, the shank 18 is inserted in the machine and tightened therein. A tool and its bushing is inserted in bore 11 and tightened therein by means of set screw 12. The tool is then aligned with the work with the nuts 22 and 23 being only of sufficient tightness against the rear surface of flange 19 to permit the head to be shifted the required amount to exactly align the tool with the work, after which the nuts 22 and 23 are tightened against the rear surface of flange 19 and thus preventing shifting of the head with relation to the shank.

It is to be brought out that the nuts being tightened against the rear surface of flange 19 does not disturb the alignment of the tool with relation to the work, whereas in the conventional types of tool holders, the clearance between the threads in the head member and the cap screws cause misalignment of the tool with relation to the work. In the device shown and described herein the studs are tightly threaded into the head member and pinned therein to prevent loosening, with the same resulting in the studs being in solid or rigid relation with the head member.

It is desired that it be understood that the presently preferred embodiment of the invention is shown and described herein, but that the same is not to be limited to the specific construction herein shown and described, but that minor changes may be made therein insofar as the changes may fall within the scope of the appended claims.

Having now fully shown and described the invention, what I claim and desire to secure by Letters Patent of the United States, is:

1. A tool holder including a head member, studs fixedly and rigidly secured to the head member, the outer ends of the studs being threaded, a shank member having a flange portion provided with holes, two of the sides of each hole being parallel to a radius of the flange portion and the other two sides being normal to said radius, the distance between the sides of each hole being greater than the diameter of the studs, the circumferential spacing of the holes and the studs being equal, a side of the hole that may be in contact with a stud being either parallel or perpendicular to said radius, and nuts threadedly engaging the studs for clamping the flange portion of the shank member to the head member.

2. A tool holder including a head member, studs fixedly and rigidly secured to the head member, the outer ends of the studs being threaded, a shank member having a flange portion provided with holes through which the studs project, two of the sides of each hole being parallel to a radius of the flange portion passing through the center of the hole and the other two sides being normal to said radius, the distance between the opposite sides of each hole being greater than the diameter of the studs so that the shank member supporting a tool may be adjusted with respect to the head member, the sides of the hole that may be in contact with a stud being either parallel or perpendicular to said radius, and nuts threadedly engaging the studs for clamping the flange portion of the shank member after the tool in the shank member has been adjusted with respect to the head member.

3. A tool holder according to claim 2 wherein the head member is provided with threaded apertures and the inner end of the studs threaded, said inner end of the studs threadedly engaging said threaded apertures.

4. A tool holder according to claim 2 wherein the head members are provided with apertures into which the studs are rigidly seated and with pins for fixedly securing the studs in the head.

5. A tool holder including a head member having threaded holes projecting inwardly from one face thereof, said holes extending a short distance into the head and terminating in a bottom, studs having threads in opposite ends thereof, each of said studs having one end threaded into a hole and tightened against the bottom thereof to firmly and rigidly support each of the studs, a shank member having a flange portion abutting said face of the head member, said flange portion being provided with holes, each of said holes having a pair of straight sides parallel to a radius of the flange extending through the center thereof and another pair of sides extending normal to said radius, the distance between the sides of each hole being greater than the diameter of the studs, the circumferential spacing of the holes and the studs being equal, a side of the hole that may be in contact with a stud being either parallel to or perpendicular to said radius, and nuts threadedly engaging the studs for clamping the flange portion of the shank member to the head member.

References Cited in the file of this patent

UNITED STATES PATENTS

| | | |
|---|---|---|
| 1,202,928 | Wallace | Oct. 31, 1916 |
| 1,483,190 | Kaegi et al. | Feb. 12, 1924 |
| 1,954,049 | Jeffrey | Apr. 10, 1934 |
| 2,472,040 | Brookfield | May 31, 1949 |
| 2,497,426 | Toth | Feb. 14, 1950 |